United States Patent Office 3,413,104
Patented Nov. 26, 1968

3,413,104
IMIDES OF OLEFIN-MALEIC ANHYDRIDE CO-
POLYMERS AS DIESEL FUEL ADDITIVES
Enver Mehmedbasich, El Cerrito, Calif., assignor to
Chevron Research Company, San Francisco, Calif.,
a corporation of Delaware
No Drawing. Continuation-in-part of application Ser. No.
417,470, Dec. 10, 1964. This application June 3, 1966,
Ser. No. 554,994
4 Claims. (Cl. 44—62)

ABSTRACT OF THE DISCLOSURE

Relatively low molecular weight 1-olefin maleimide copolymers, having amine nitrogen in the substituent on the maleimide nitrogen, are provided for use as detergents in compression ignition engines.

---

This application is a continuation-in-part of application Ser. No. 417,470, filed Dec. 10, 1964.

This invention concerns novel multifunctional fuel oil additives and fuel oil compositions thereof. More particularly, this invention concerns novel relatively low molecular weight polyimides and their use in fuel as dispersants and detergents.

Fuels are susceptible to chemical reaction on aging. The effect of oxidation is to produce soluble and insoluble materials of higher molecular weight and boiling point than the original fuel. The deterioration due to oxidation and the like of distillate fuels, particularly in diesel fuel, manifests itself, for example, through the appearance of color and gums. The tacky oxidized fuel deposits adhere readily to injector parts and can cause injector sticking, nozzle hole plugging and leakage past critical surfaces.

Also, diesel engines are equipped with fuel filters to remove particulate matter from the fuel. Any gums which are present in the fuel tend to coat onto the filter requiring frequent changes of the filter in order to permit adequate fuel flow as well as effective filtering action.

While many materials might effectively act as commercially successful dispersants for the gum, the field is severely limited to relatively few materials. For, since the dispersant is an additive to the fuel, it must not significantly increase the deposits created in the combustion chamber, which interfere with the proper functioning of the piston. In order to have an acceptable fuel dispersant, it is not only necessary that the dispersant maintain the gums dispersed in the fuel mixture, but the dispersant itself, when introduced into the combustion chamber should not form deposits which significantly interfere with the operation of the piston.

Pursuant to this invention, novel fuel dispersants are provided which are oil soluble alternating copolymers of N-substituted maleimides and aliphatic 1-olefins of from 8 to 30 carbon atoms, more usually 10 to 24 carbon atoms, having from 4 to 20 maleimide groups. That is, a succinimide group alternates with an alkyl substituted ethylene. The substituents on the nitrogen of the maleimide may be the same or different and are organic radicals composed solely of carbon, hydrogen and nitrogen having a total of from 3 to 60 carbon atoms and from 1 to 5 amine nitrogen atoms. The substituents on the succinimide nitrogen can be aminoalkyl, polyamino alkylene or the mono-N- or di-N,N-aliphatic hydrocarbyl substituted derivatives thereof. (By the term "aliphatic hydrocarbyl" is intended organic radicals free of aromatic unsaturation composed solely of carbon and hydrogen.) The total molecular weight of the molecule will generally be in the range of about 2,000 to 15,000, more usually in the range of about 4,000 to 10,000.

The polymers of this invention have as the repeating group, a unit of the following structure:

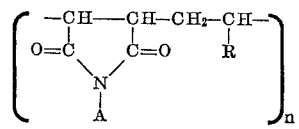

wherein A is an organic radical of from 3 to 60 carbon atoms, more usually of from 3 to 30 carbon atoms having from 1 to 5 amine nitrogens and free of aromatic unsaturation. The symbol A includes aminoalkyl, polyalkylene amine, N-hydrocarbyl, aminoalkyl, N-hydrocarbyl polyalkylene amine and N,N-dihydrocarbyl aminoalkyl, wherein the hydrocarbyl groups are free of aromatic unsaturation. Usually, the hydrocarbyl groups will be aliphatic; that is, acylic, but may be alicyclic or taken together with the nitrogen, heterocyclic. R is an alkyl radical of from 6 to 28 carbon atoms, and $n$ is an integer of from 4 to 20. Usually, R will be of from about 8 to 20 carbon atoms, more usually from 12 to 18, and $n$ from about 6 to 16.

One subgenus within the scope of the invention has the following formula:

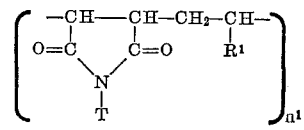

wherein T is aminohydrocarbyl free of aromatic unsaturation, generally of from 5 to 26 carbon atoms (aminohydrocarbyl free of aromatic unsaturation is a monovalent organic radical composed solely of carbon, hydrogen and one nitrogen, wherein the nitrogen is present only as primary, secondary or tertiary amines, and the radical is aliphatic, alicyclic or heterocyclic having nitrogen as its only annular heteroatom); $R^1$ is an alkyl radical of from 6 to 28 carbon atoms, preferably of from 8 to 20 carbon atoms; $n^1$ is an integer of from 4 to 20, more usually of from 6 to 16.

The particularly preferred compositions of the aminohydrocarbyl substituted compounds are those wherein the aminohydrocarbyl group is aliphatic of from 5 to 26 carbon atoms having one secondary nitrogen atom separated by not more than 6 carbon atoms from the succinimide nitrogen. The nitrogen atom may be part of the chain or may be pendant from the chain.

The polyalkylene amine compositions will have the following formula:

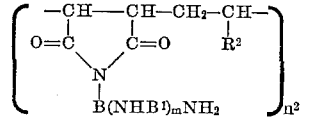

wherein B and $B^1$ are alkylene of from 2 to 6 carbon atoms, more usually of from 2 to 3 carbon atoms, $m$ is an integer of from 0 to 4, usually of from 0 to 3, $R^2$ is an alkyl radical of from 6 to 28 carbon atoms, preferably of from 8 to 20 carbon atoms, and $n^2$ is an integer of from 4 to 20, more usually of from 6 to 16.

While, usually, the alkylene polyamines will be unsubstituted, if desired, substituted alkylene polyamines may be used having from 1 to 2 aliphatic hydrocarbyl substituents on the nitrogen atoms.

The remaining 2 valences of the polymer will be satisfied in a variety of ways. One or both of the valences may be satisfied by a radical derived from the polymer initiator. The polymeric chain may terminate by transfer, coupling or disproportionation, resulting in alkyl groups, alkenyl groups, succinimide or maleyl groups or radicals derived from the initiator.

Illustrative of various aminohydrocarbyl radicals are aminohexyl, aminodecyl, aminooctadecyl, N-hexylaminohexyl, N-decylaminopropyl, N-hexadecylaminohexyl, N-hexylpyrrolidinyl, N,N-diethylaminobutyl, N-abietyl 3-aminopropyl, N-dihydroabietyl 2-aminoethyl, etc.

Illustrative of various alkylene amine and polyalkylene polyamine radicals are tetraethylenyl tetramine, triethylenyl triamine, diethylenyl diamine, dipropenyl diamine, tripropenyl triamine, etc.

A particularly preferred group of compounds have repeating units of the formula:

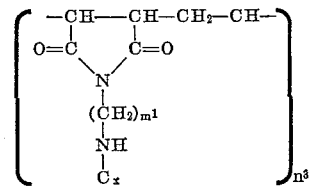

wherein $R^3$ is an alkyl radical of from 8 to 20 carbon atoms, $m^1$ is an integer of from 2 to 3, $C_x$ indicates an aliphatic hydrocarbon radical having $x$ number of carbon atoms wherein $x$ is an integer of from 8 to 20, i.e., $C_{8-20}$, and $n^3$ is an integer of from 6 to 16. The aliphatic radical may be straight chain or branched, free of aliphatic unsaturation or unsaturated, particularly olefinically unsaturated.

Illustrative of the particularly preferred substituents on the succinimide nitrogen are N-octyl 3-aminopropyl, N-decyl 2-aminoethyl, N-dodecyl 2-aminoethyl, N-hexadecenyl 2-aminoethyl, N-octadecenyl 3-aminopropyl, N-tetradecyl 2-aminoethyl, N-eicosneyl 3-aminopropl, N-tetrapropenyl 2-aminoethyl, N-octadecadienyl 2-aminoethyl, N-hexadecenyl 3-aminopropyl, N-ocetadecyl 3-aminopropyl, N-octadecenyl 2-aminoethyl, etc.

The compounds of this invention are readily prepared by copolymerizing an aliphatic 1-olefin of from 8 to 30 carbon atoms with maleic anhydride by means of free radical catalysis and then combining the resulting polymer with the desired amine at elevated temperatures to form the alternating N-substituted polysuccinimide.

The copolymerization of maleic anhydride with aliphatic 1-olefins is well known in the art. See for example U.S. Patent No. 3,051,562.

The olefins which find use include decene, dodecene, tetradecene, hexadecene, octadecene, eicosene, docosene, tetracosene, hexacosene, octacosene, triacontene, tridecene, pentadecene, heptadecene, nonadecene, tetrapropylene, tetraisobutylene, hexapropylene, etc. Preferably, a mixture of olefins will be used rather than a single olefin. When using mixed olefins, superior fuel solubility is obtained. The mixture will generally have not more than 50 percent of any single olefin, and preferably not more than 30 mole percent of any single olefin.

The free radical catalyst may be any organic compound which at a temperature in the range of 50° to 100° C. decomposes to form free radicals which may then initiate the polymeric chain, although temperatures outside this range may be used advantageously under some conditions. The most popular organic free radical agents are the peroxidic initiators—hydroperoxide, dihydrocarbyl peroxide, and diacyl peroxide—and azo compounds. Illustrative of hydroperoxide catalysts are cumyl hydroperoxide, pinane hydroperoxide, tert.-butyl hydroperoxide, p-menthane hydroperoxide, etc. Illustrative of dihydrocarbyl peroxides are dicumyl peroxide, ascaridole, di-tert.-butyl peroxide, etc. Illustrative of diacyl peroxides are benzoyl peroxide, lauroyl peroxide, acetyl peroxide, 2,4-dichlorobenzoyl peroxide, etc.

In carrying out the various polymerizations, inert hydrocarbons or halohydrocarbons may be used to advantage. Illustrative of such solvents are benzene, toluene, chlorobenzene, etc.

Usually, the solvent will be from 20 to 80 weight percent of the total reaction mixture, more usually about 30 to 70 weight percent.

The mole ratio of α-olefin to maleic anhydride will generally be about 0.9–1.2:1.2–0.9, more usually about 1:1. The ratio of olefin to catalyst will generally be 1:0.005–0.1 mole ratio, more usually 1:0.01–0.1 mole ratio.

As already indicated, the temperatures will depend upon the catalyst. Temperatures in the range of 50° to 100° C. may be used; more usually the temperature will be in the range of about 75° to 95° C. The time for the reaction will depend on the catalyst used, the amount of material, and the other variables. Generally, at least one hour will be required, and usually the reaction will not be carried out for more than a period of 24 hours.

Depending on the amount of the materials, the catalyst may be added in a single addition or in aliquot portions during the course of the reaction, maintaining a relatively constant concentration of free radicals in the reaction mixture.

The reaction of the copolymer with the relevant amine is readily carried out by combining the copolymer with the amine in an inert hydrocarbon solvent at elevated temperatures (50°–150° C.) and removing the water as formed. Preferably, an aromatic hydrocarbon solvent is used which allows for azeotroping the water. When the stoichiometric amount of water has been obtained, the reaction is stopped.

The following examples are offered by way of illustration and not by way of limitation.

Example A

Into a reaction flask was introduced 243 g. (1.0 mole) of $C_{15-20}$ cracked wax 1-olefin [1] 98 g. (1.0 mole) of maleic anhydride and 341 g. of benzene. The mixture was stirred at a temperature of 140° F. and 9.7 g. (0.04 mole) of benzoyl peroxide and a minimum of benzene added. The solution was then heated at 185° F. for 12 hours. The reaction product was precipitated with methanol and redissolved in benzene. The yield was 290 g. (85%).

The product was characterized by its infrared spectrum.

Example I

Into a reaction flask was introduced 341 g. (1.0 mole) of a 50.0 weight percent solution of a copolymer prepared as in Example A in benzene, 324 g. (1.0 mole) of N-octadecenyl propylenediamine, and 306 g. of xylene. The mixture was stirred at a temperature of 356° F. for 6 hours at which time approximately 18 g. of water was collected in a trap. The mixture was then filtered through Celite. The yield was 582 g. (90%). The product was characterized by its infrared spectrum, showing the characteristic succinimide absorption. Molecular weight (ThermoNAM)=6140.

Example II

Into a reaction flask was introduced 341 g. (1 mole) of a 50 weight percent solution of copolymer prepared as in Example A in benzene and 102.1 g. (1 mole) of dimethylaminopropylamine and diluted with 84 g. of xylene. After heating the mixture for 6 hours at 80° to 90° C., one mole of water was obtained. The product was then isolated and characterized by its infrared spectrum. The characteristic succinimide absorption was found.

---

[1] $C_{15-20}$:

| No. of carbon atoms | Mole percent |
|---|---|
| 14 | 1 |
| 15 | 12 |
| 16 | 19 |
| 17 | 18 |
| 18 | 18 |
| 19 | 17 |
| 20 | 14 |
| 21 | 1 |
| 1-olefin | 94 |
| Straight chain | 86 |

Example III

Into a reaction flask was introduced 72.1 g. (0.38 mole) of a mixture having as the major component and the average composition tetraethylene pentamine, 185 g. of xylene and 185 g. of an aromatic thinner. This mixture was heated to 115° C. and 131 g. (0.38 mole) of copolymer prepared as in Example A dissolved in 300 g. of xylene added slowly over a period of 4 hours. After maintaining a temperature of 130° C. for 4 hours, the stoichiometric amount of water was azeotroped off. The product was characterized by its infrared spectrum.

The novel compositions of this invention find use, particularly with compression ignition engines, e.g., diesel engines. The compositions are readily compatible with a variety of fuels and may be prepared as concentrates or at concentrations to be used directly in the engine. As concentrates, concentrations in the range of 25 to 75% find use, while in the engine, the additive concentration will be in the range from about 10 to 2000 p.p.m., more usually in the range of about 25 to 250 p.p.m.

The base fuel which may be used, in accordance with the invention, may be a straight run or a cracked petroleum distillate; or a residual fuel; or it may be a fuel derived from shale; or one produced synthetically, for instance, by the Fischer-Tropsch process. It may also be a mixture of two or more of the aforementioned fuels. The base fuels used boil in the range from about 325° to 750° F. In other words, they are suitable for use in engines of the diesel type, and the like.

In order to demonstrate the excellent dispersancy of the compositions of this invention, the exemplary compositions were tested under a variety of generally accepted tests which determine the acceptability of a composition as a dispersant. Both fresh fuel and fuel which had been allowed to age for a considerable length of time were tested, comparing fuel compositions containing the exemplary additives of this invention and the same fuel composition without the exemplary additives.

An eccelerated stability test, known as the Santa Fe Stability Test, comprises heating a sample fuel for 90 minutes at 300° F., cooling at ambient temperatures for 90 minutes, and then filtering through a Whatman No. 1 filter paper. The appearance of the deposits on the filter is rated by a reflectometer on a rating scale of 100% reflectance for a new white filter and 0% reflectance for a completely black filter.

A second stability test was carried out by heating the fuel for 20 hours at 200° F. The fuel was then cooled at ambient temperature for 24 hours and filtered through a tared 5-micron pore size Millipore membrane filter. The filter is then weighed and the results are shown as parts per million of filter residue.

Finally, a long-term storage test was carried out by aging the fuels for 4 weeks at 140° F. and then cooling, followed by filtering the cooled, aged fuel through a tared 5-micron pore sibe Millipore membrane filter. The filter is then weighed, and the results are shown as parts per million of filter residue.

The fuel used was a 70% catalytically cracked light cycle oil plus 30% vacuum top-cut straight run. The following table indicates the results.

TABLE I

| Additive | Concentration, p.p.m. | Initial ASTM[1] Color | Santa Fe Stability Test, Percent Reflectance[2] | 20 hours, 200° F. | | 4 weeks, 140° F. | |
|---|---|---|---|---|---|---|---|
| | | | | Filter Residue | ASTM Color p.p.m. | Filter Residue | ASTM Color p.p.m. |
| Fresh Fuel: | | | | | | | |
| None | | 1.5 | 77 | 10 | 5.5 | 37 | 6.5 |
| Ex. I | 25 | 1.5 | 88 | 3 | 5.0 | 29 | L 7.0 |
| Ex. I | 100 | 1.5 | 92 | 4 | L 4.5 | 6 | L 7.0 |
| Ex. I | 200 | 1.5 | 92 | 3 | L 4.5 | 4 | 7.0 |
| Commercial Additive A | 100 | 1.5 | 84 | 3 | 5.0 | 26 | L 7.0 |
| Commercial Additive B | 200 | 1.5 | 74 | 9 | L 5.5 | 42 | 6.5 |
| Aged Fuel A: | | | | | | | |
| None | | | | 50 | 20 | | |
| Ex. I | 100 | | | 79 | 2 | | |
| Commercial Additive A | 100 | | | 69 | 7 | | |
| Commercial Additive B | 200 | | | 51 | 25 | | |
| Aged Fuel B: | | | | | | | |
| None | | | | 51 | 15 | | |
| Ex. I | 100 | | | 92 | | | |
| Ex. II | 100 | | | 84 | 2 | | |
| Ex. III | 100 | | | 87 | 2 | | |

[1] ASTM No. D-1500-58T.
[2] Pass, above 73; Borderline, 53-72; Reject, below 52.

It is evident from the above data that the dispersants of this invention prevent the formation of material which would interfere with engine filters, while at the same time maintaining excellent color stability, the latter, particularly important for pipeline transport.

The following test was carried out to determine the capability of the subject compositions in maintaining the nozzle injector free of deposits. The test uses a modified CFR diesel engine where the fuel injector system has the nozzle cooling restricted in order to increase the severity of the test. The injector deposits obtained in this test are rated with the aid of a reflectometer. The results of this test are reported as percent deposits relative to base fuel without additive.

TABLE II

| Additive | Concentration, p.p.m. | Relative Injector Deposits |
|---|---|---|
| | | 100 |
| Ex. I | 200 | 84 |

An exemplary composition of this invention was also tested in the Cummins Engine Test. Two high-load, 100-hr. tests were carried out in a NH-220 Cummins diesel engine on base fuel (70% catalytically cracked light cycle oil plus 30% vacuum top cut straight run) and base fuel compounded with 100 p.p.m. of Example I. The deposits were extracted from the filters with a mixture of solvents in a Soxhlet extractor. The solvents were removed in vacuo and the resulting deposits weighed. Also noted by visual inspection was the state of the plungers and cups as well as the smoke.

TABLE III

| Additive | Concentration, p.p.m. | Injector Conditions | | Exhaust Smoke, percent | | Filter Deposits, grams |
|---|---|---|---|---|---|---|
| | | Plunger | Cups | Start of run | End of Test | |
| None | | Heavy deposits | Heavy internal and tip deposits with some holes plugged and distorted. | 2 | 6 | 25.0 |
| Ex. I | 100 | Light deposits | Light internal deposits and moderate tip deposits. No plugged holes. | 4 | 3 | 0.9 |

Finally, to demonstrate that the additives did not increase piston deposits and, therefore, do not interfere with the proper operation of the engine, engine runs were carried out under L–1 Supplement-1 conditions (MIL–L–2140A Specification). The test fuels were a 1% sulfur content straight-run distillate diesel fuel with and without 100 parts per million of Example I.

TABLE IV

| Additive | Conc. | Groove Deposits | Land Deposits |
|---|---|---|---|
| None | | 4-0.3-2-0.3 | 25-3-35 |
| Ex. I | 100 | 5-0.5-3-0.3 | 10-2-30 |

The deposit data show that the compounds of this invention do not have any adverse effect on piston deposits. They further show that the compounds of this invention are compatible with conventional metallic lubricating oil additives.

The compounds of this invention were also found to provide excellent rust inhibition and good water tolerance. Therefore, the compounds of this invention provide a variety of improvements to fuels with a minimum, or absence of deleterious effects.

Other additives may also be included in the fuel in combination with the present additives, as well as to provide further improvements; such additives include antioxidants, metal deactivators and cetane improvers.

As will be evident to those skilled in the art, various modifications on this invention can be made or followed, in the light of the foregoing disclosure and discussion, without departing from the spirit or scope of the disclosure or from the scope of the following claims.

I claim:

1. A fuel for compression ignition engines having in an amount sufficient to provide detergency and dispersancy a copolymer of from 2,000 to 15,000 molecular weight having as the repeating group a unit of the following structure:

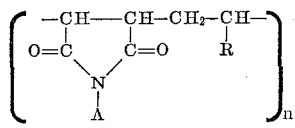

wherein A is an organic radical composed solely from carbon, hydrogen and from 1 to 5 amine nitrogen atoms, is of from 3 to 30 carbon atoms and free of aromatic unsaturation, R is an alkyl radical of from 6 to 28 carbon atoms and $n$ is an integer of from 4 to 20.

2. A fuel according to claim 1, wherein said compression ignition engine is a diesel engine and in the formula of said copolymer, A is of the formula, $$-(CH_2)_{m_1}NHC_x$$

wherein $m_1$ is an integer of from 2 to 3, $C_x$ is an aliphatic hydrocarbon radical having $x$ number of carbon atoms, wherein $x$ is an integer of from 8 to 20, R is an alkyl radical of from 8 to 20 carbon atoms, and $n$ is an integer of from 6 to 16.

3. A fuel composition according to claim 1, wherein said compression ignition engine is a diesel engine, A is of the formula $$-B(NMB^1)_mNH_2$$

wherein B and $B^1$ are alkylene of from 2 to 6 carbon atoms, $m$ is an integer of from 0 to 4, R is an alkyl radical of from 8 to 20 carbon atoms and $n$ is an integer of from 6 to 16.

4. A fuel according to claim 2, wherein $C_x$ is a straight chain aliphatic hydrocarbon radical.

References Cited

UNITED STATES PATENTS 3,010,810  11/1961  Stayner et al. _____ 44—62
3,235,503  2/1966  De Vries _____ 44—62 X DANIEL E. WYMAN, *Primary Examiner.*

W. J. SHINE, *Assistant Examiner.*